United States Patent
Fabre (10) Patent No.: US 7,069,327 B1
(45) Date of Patent: Jun. 27, 2006

(54) METHOD AND APPARATUS FOR REDUCING FIRST COPY OUT TIMES USING UNIQUENESS IDENTIFIERS

(75) Inventor: B. Scott Fabre, Aloha, OR (US)

(73) Assignee: Sharp Laboratories of America, Inc., Lamas, WA (US)

( * ) Notice: Subject to any disclaimer, the term of this patent is extended or adjusted under 35 U.S.C. 154(b) by 0 days.

(21) Appl. No.: 09/517,364

(22) Filed: Mar. 2, 2000

(51) Int. Cl.
*G06F 15/16* (2006.01)
*G06F 13/14* (2006.01)

(52) U.S. Cl. ..................... 709/227; 358/1.15
(58) Field of Classification Search ............... 358/412, 358/296, 1.16, 1.15, 1.17; 709/227–229; 382/298

See application file for complete search history.

(56) References Cited

U.S. PATENT DOCUMENTS

| | | | | |
|---|---|---|---|---|
| 4,942,541 | A * | 7/1990 | Hoel et al. ................. | 358/1.16 |
| 5,175,632 | A * | 12/1992 | Hayashi et al. ............. | 358/401 |
| 5,287,194 | A * | 2/1994 | Lobiondo ................... | 358/296 |
| 5,450,532 | A | 9/1995 | Bockman et al. | |
| 5,564,117 | A | 10/1996 | Lentz et al. | |
| 5,579,517 | A * | 11/1996 | Reynolds et al. ........... | 707/200 |
| 5,587,800 | A | 12/1996 | Miyazaki | |
| 5,592,593 | A * | 1/1997 | Speed ........................ | 358/1.11 |
| 5,592,594 | A * | 1/1997 | Cahoon ...................... | 358/1.16 |
| 5,680,488 | A | 10/1997 | Shimooku | |
| 5,796,411 | A | 8/1998 | Cyman et al. | |
| 5,842,216 | A | 11/1998 | Anderson et al. | |
| 6,145,031 | A * | 11/2000 | Mastie et al. ................ | 710/52 |
| 6,249,782 | B1 * | 6/2001 | Day et al. ....................... | 707/2 |
| 6,373,585 | B1 * | 4/2002 | Mastie et al. ............... | 358/1.15 |
| 6,457,883 | B1 * | 10/2002 | Silverbrook et al. .......... | 400/62 |
| 6,498,656 | B1 * | 12/2002 | Mastie et al. ............... | 358/1.15 |
| 6,515,756 | B1 * | 2/2003 | Mastie et al. ............... | 358/1.15 |
| 6,567,622 | B1 * | 5/2003 | Phillips ....................... | 399/24 |
| 6,592,275 | B1 * | 7/2003 | Aihara et al. ................. | 400/62 |
| 6,659,662 | B1 * | 12/2003 | Grohs ........................ | 400/76 |
| 6,700,678 | B1 * | 3/2004 | Luman ....................... | 358/1.15 |
| 6,819,445 | B1 * | 11/2004 | Stevenson et al. ......... | 358/1.15 |
| 2005/0172124 | A1 * | 8/2005 | Carpentier et al. ......... | 713/165 |

* cited by examiner

*Primary Examiner*—Larry D. Donaghue
(74) *Attorney, Agent, or Firm*—Law Office of Karen Dana Oster, LLC (57) ABSTRACT

A method for reducing first copy out times of printed matter. To implement the method, a request to print at least a portion of the printed matter is executed. Then, a uniqueness identifier is generated in a host computer, the uniqueness identifier specifically associated with the at least a portion of the printed matter. Next, the uniqueness identifier is compared to a list of uniqueness identifiers stored in memory. If the uniqueness identifier is found in the list of uniqueness identifiers, at least a portion of the printed matter is printed using data stored in a memory location referenced by the list of uniqueness identifiers. If the uniqueness identifier is not found in the list of uniqueness identifiers, the uniqueness identifier is stored and a reference to data is stored in memory pertaining to the at least a portion of the printed matter in the list of uniqueness identifiers.

14 Claims, 5 Drawing Sheets

METHOD AND APPARATUS FOR REDUCING FIRST COPY OUT TIMES USING UNIQUENESS IDENTIFIERS

BACKGROUND OF THE INVENTION

The present invention is directed to a method and apparatus for reducing first copy out (FCO) times for printing documentation and specifically to a method and apparatus that uses uniqueness identifiers to reduce FCO times.

As demand for printing speed increases, manufacturers are having to look beyond the standard speed-increasing mechanisms such as faster machines, wider bandwidths, and process caching.

Faster printer speeds and faster data transfer methods, as mentioned above, can significantly increase the speed of the printing process. However, these solutions are often costly to implement. Also, as the industry reaches maximum speeds, creative solutions will be needed to satisfy the need for increasing the printing process speeds.

One time-consuming part of the printing process is the time it takes to render or define the content of a predetermined area. Users often see this rendering delay as the period of time from the moment the user initiates a print command until the printer prints the document or print job. (It should be noted that other factors may contribute to the delay; however, the rendering factor can be significant.) Further, each time a print job is printed it is re-rendered, even if the print job has not changed or if only minor changes have been made.

BRIEF SUMMARY OF THE INVENTION

The present invention seeks to reduce the rendering delay by eliminating the need to re-render previously rendered print jobs or subportions thereof.

The present invention is directed to a method for reducing first copy out times of printed matter. To implement the method, a request to print at least a portion of the printed matter is executed. Then, a uniqueness identifier is generated in a host computer, the uniqueness identifier specifically associated with the at least a portion of the printed matter. Next, the uniqueness identifier is compared to a list of uniqueness identifiers stored in memory. If the uniqueness identifier is found in the list of uniqueness identifiers, at least a portion of the printed matter is printed using data stored in a memory location referenced by the list of uniqueness identifiers. If the uniqueness identifier is not found in the list of uniqueness identifiers, the uniqueness identifier is stored and a reference to data is stored in memory pertaining to the at least a portion of the printed matter in the list of uniqueness identifiers. In one preferred embodiment, the step of comparing the uniqueness identifier to a list of uniqueness identifiers stored in memory further comprises the step of comparing the uniqueness identifier to a list of uniqueness identifiers stored in memory in a printer. One preferred embodiment includes the step of transferring the uniqueness identifier from the host computer to the printer. One preferred embodiment includes the step of transferring all or part of the at least a portion of the printed matter from the host computer to the printer if the uniqueness identifier is not found in the list of uniqueness identifiers.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

The present invention is directed to a method and apparatus for reducing first copy out times. Specifically, this invention uses uniqueness identifiers to accomplish this task. As each print job is prepared for printing, a uniqueness identifier is assigned to the print job. Preferably, the print job is divided into portions, such as pages, images, chapters, paragraphs, sentences, headers, and/or watermarks. Each portion is also assigned a uniqueness identifier. As a document or portion is reprinted, or future versions of the document or portions are printed, this invention allows the original rendered version or portion of that version to be accessed in memory and printed. Since the time it takes to transfer and render data is usually greater than the time it takes to access a previous rendering, this procedure potentially saves significant time.

Figure 1:
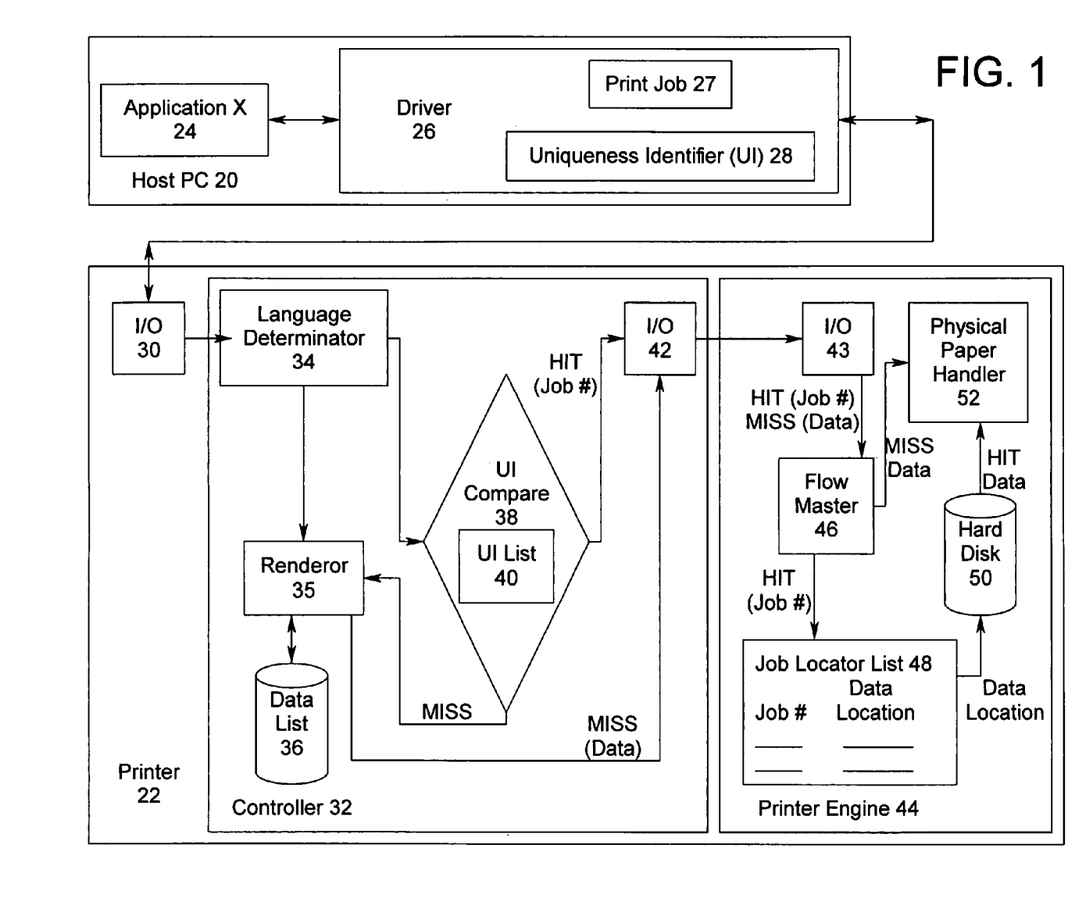
FIG. 1 is a simplified structural diagram of an exemplary host computer in communication with an exemplary printer suitable for implementing the present invention.

FIG. 1 shows an exemplary embodiment of a host computer 20 and a printer 22 on which the present invention may be implemented. The shown embodiment uses a host computer 20 that includes at least one application 24 and a print driver 26. The application 24 is suitable for calling the print driver 26 to print a print job 27. The print driver 26 is suitable for generating at least one uniqueness identifier 28. The print driver 26 or other transfer mechanism is used for transferring or passing the print job 27 and the uniqueness identifier 28 to the printer 22.

In the exemplary computer 20 and printer 22, the print job 27 and the uniqueness identifier 28 are passed to the printer 22 through an input/output mechanism 30 to a controller 32 of the printer 22. The controller 32, shown as physically situated in printer 22, may include one or more of the following features: a language determinator 34 that accesses print job 27 to identify, interpret, and implement commands; a renderor 35 that receives data to be rendered from the language determinator 34; a data list 36 that receives and stores data from the renderor 35; a uniqueness identifier compare 38 that compares the provided uniqueness identifiers 28 to those stored on a uniqueness identifier list or cache tag table 40; and an input/output mechanism 42 for passing information to an associated input/output mechanism 43 in the printer engine. The uniqueness identifier compare 38 compares the supplied uniqueness identifier 28 to those in the uniqueness identifier list 40. If there is a match or HIT, a job number associated with each uniqueness identifier in the uniqueness identifier list 40 is provided to the uniqueness identifier compare 38. The uniqueness identifier compare 38 then passes the HIT information including the job number through input/output 42 to input/output 43. If there is no match or MISS, that information is passed to the renderor 35 that then passes the MISS information (including the rendered data) from the data list 36 through input/output 42 to input/output 43.

The printer or copier engine 44 may include one or more of the following features: an input/output mechanism 43; a flow master or decision utility 46; a job locator list 48; a hard disk 50; and a physical paper handler 52. The input/output mechanism passes information to the flow master 46. If the information passed to the flow master 46 indicates a HIT, the flow master 46 passes a job number to the job locator list 48 that is used to look up the data location of the previously rendered data on the hard disk 50. The previously rendered HIT data is then sent to the physical paper handler 52 for printing. If the information passed to the flow master 46 indicates a MISS, the flow master 46 passes MISS rendered data to the physical paper handler 52 for printing.

It should be noted that the present invention may also be implemented over a network, on a dedicated word processing machine, or any host machine. Further, the above set forth configuration is meant to be exemplary as many alternate configurations and additional features are included in the scope of the invention. One example of an alternate configuration is that the uniqueness identifier 28 may be generated by a uniqueness identifier generator separate and distinct from the driver 26. An example of an additional feature is that, although not shown, each time data is rendered (a MISS), the rendered data is stored on the hard disk 50, its location is stored on the job locator list 48, and the associated job number is recorded with the uniqueness identifier 28 on the uniqueness identifier list 40.

Figure 2:
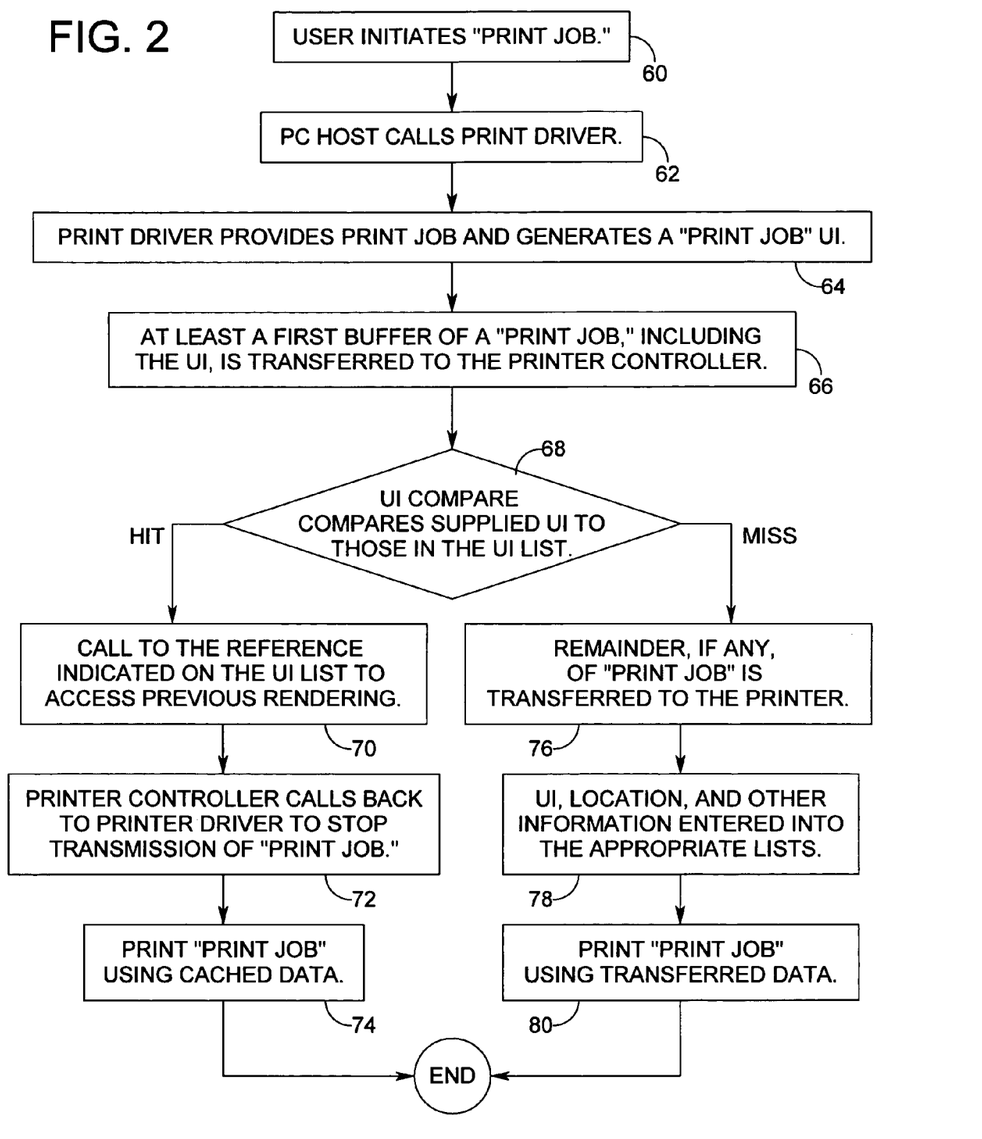
FIG. 2 is a simplified flow chart of an exemplary process for reducing FCO time using a "print job" uniqueness identifier.

FIG. 2 shows a simple implementation of the present invention in which it is determined whether the entire "print job" has previously been rendered and printed. Specifically, after the user (possibly through an application 24) initiates a print job 60, a host computer calls a print driver 62. The print driver then generates a "print job" uniqueness identifier 64. At least a first buffer of the "print job" and the "print job" uniqueness identifier are then transferred to the printer controller 66. The printer controller then uses the uniqueness identifier compare to compare the supplied "print job" uniqueness identifier to the uniqueness identifiers in a uniqueness identifier list 68.

If the "print job" uniqueness identifier is found in the uniqueness identifier list, a "HIT" is registered. If a HIT occurs, the printer controller calls to the reference location indicated on the uniqueness identifier list to access the previous rendering 70. (An exemplary method of referencing the reference location described in detail above uses a job number from the uniqueness identifier list 40 that references a data location on the job locator list 48 to find the data rendering on the hard disk 50.) Then the printer controller calls back to the printer driver to stop transmission of the "print job" 72. Finally, the "print job" is printed using the cached data 74.

On the other hand, if the uniqueness identifier is not found in the uniqueness identifier list, a "MISS" is registered. If a MISS occurs, the remainder, if any, of the "print job" is transferred to the printer 76. Then the reference location information (e.g. the uniqueness identifier, job number, and data location) is entered into appropriate lists (e.g. the uniqueness identifier list 40 and the job locator list 48) 78. Finally, the "print job" is printed using the transferred data 80.

Figure 3:
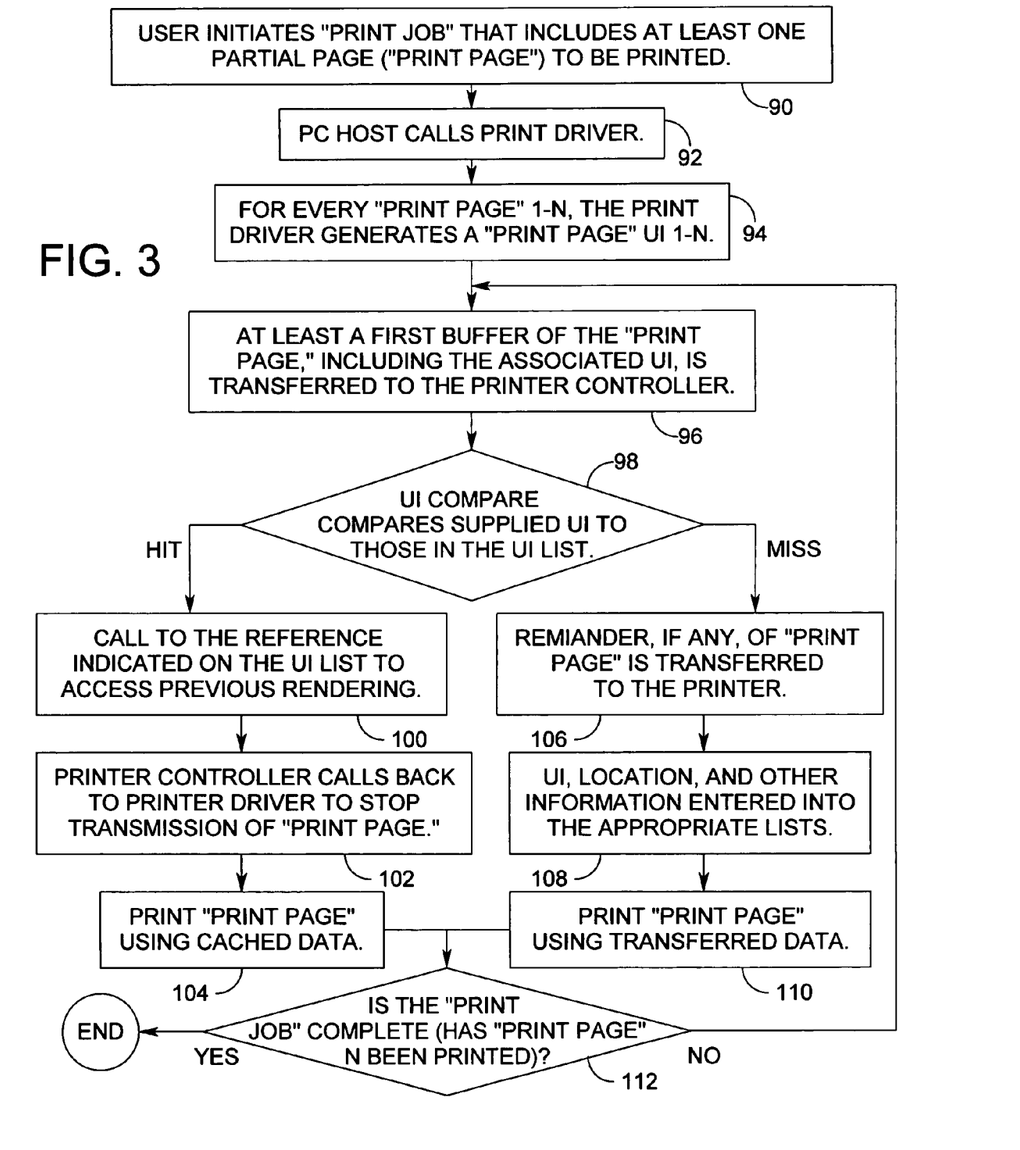
FIG. 3 is a simplified flow chart of an exemplary process for reducing FCO time using a "print page" uniqueness identifier.

FIG. 3 shows an alternate implementation of the present invention in which it is determined whether each separate individual page ("print page") of a complete "print job" has previously been rendered and printed. Specifically, after the user (possibly through an application) initiates a print job 90, a host computer calls a print driver 92. For every "print page" 1 to N, the print driver generates an associated "print page" uniqueness identifier 1 to N. At least a first buffer of the "print page," including the associated "print page" uniqueness identifier, is then transferred to the printer controller 96. The printer controller then uses the uniqueness identifier compare to compare the supplied "print page" uniqueness identifier to the uniqueness identifiers in a uniqueness identifier list 98.

If the uniqueness identifier is found in the uniqueness identifier list, a "HIT" is registered. If a HIT occurs, the printer controller calls to the reference location indicated on the uniqueness identifier list to access the previous rendering 100. (An exemplary method of referencing the reference location described in detail above uses a job number from the uniqueness identifier list 40 that references a data location on the job locator list 48 to find the data rendering on the hard disk 50.) Then the printer controller calls back to the printer driver to stop transmission of the "print page" 102. Finally, the "print page" is printed using the cached data 104.

On the other hand, if the uniqueness identifier is not found in the uniqueness identifier list, a "MISS" is registered. If a MISS occurs, the remainder, if any, of the "print page" is transferred to the printer 106. Then the reference location information (e.g. the uniqueness identifier, job number, and data location) is entered into appropriate lists (e.g. the uniqueness identifier list 40 and the job locator list 48) 108. Finally, the "print page" is printed using the transferred data 110.

Whether the uniqueness identifier compare has found a HIT or MISS, after the individual page has been printed it must then be determined whether the "print job" is complete 112. In other words, the program determines whether "print page" N has been printed 112. If the "print job" is complete, the program ends. If the "print job" is not complete, the program loops back to the portion of the program just prior to the "print page" and the associated uniqueness identifier being transferred to the printer controller. The program "loops" for each of the N pages of the "print job."

Figure 4:
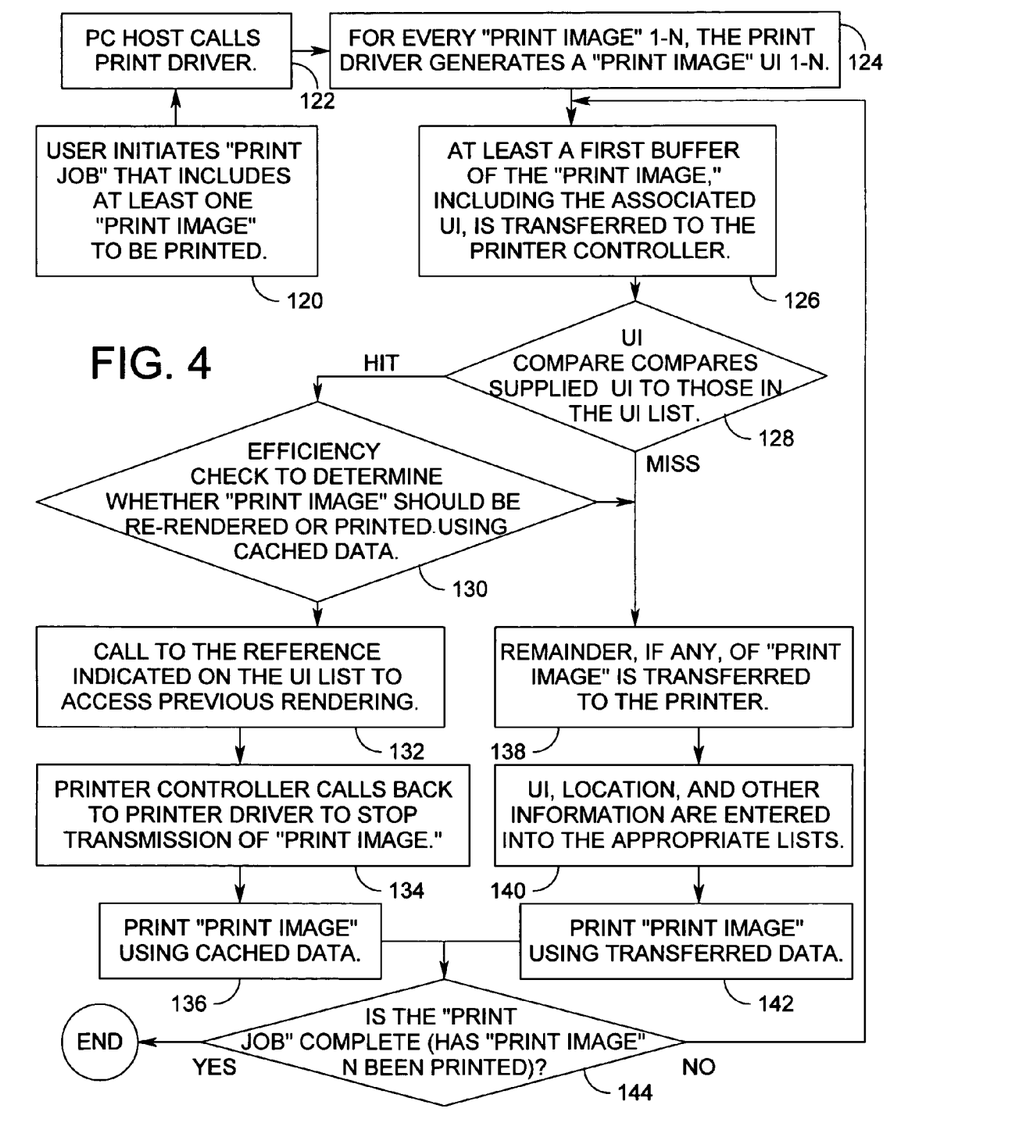
FIG. 4 is a simplified flow chart of an exemplary process for reducing FCO time using a "print image" uniqueness identifier.

FIG. 4 shows another alternate implementation of the present invention in which it is determined whether each separate image ("print image") of a complete "print job" has previously been rendered and printed. Specifically, after the user (possibly through an application) initiates a print job 120, a host computer calls a print driver 122. For every "print image" 1 to N, the print driver 26 generates an associated "print image" uniqueness identifier 1 to N 124. At least a first buffer of the "print image," including the associated uniqueness identifier, is then transferred to the printer controller 126. The printer controller then uses the uniqueness identifier compare to compare the supplied "print image" uniqueness identifier to the uniqueness identifiers in a uniqueness identifier list 128.

If the uniqueness identifier is found in the uniqueness identifier list, a "HIT" is registered. If a HIT occurs, an optional efficiency check may be performed to determine whether the "print image" should be re-rendered or printed using cached data 130. This determination would most likely be based on such exemplary factors as the size of the "print image" and the speed of the host computer and printer. If the efficiency check determines it would be more efficient to re-render, the procedure associated with a MISS as set forth below is followed. Otherwise, the next step of the HIT procedure would be to access the reference location indicated on the uniqueness identifier list to retrieve the previous rendering 132. (An exemplary method of referencing the reference location described in detail above uses a job number from the uniqueness identifier list 40 that references a data location on the job locator list 48 to find the data rendering on the hard disk 50.) Then the printer controller 32 would call back to the printer driver 26 to stop transmission of the "print image" 134. Finally, the "print image" is printed using the cached data 136.

On the other hand, if the uniqueness identifier is not found in the uniqueness identifier list, a "MISS" is registered. If a MISS occurs or the result of the efficiency check so dictates, the remainder, if any, of the "print image" is transferred to the printer 138. Then the reference location information (e.g. the uniqueness identifier, job number, and data location) is entered into appropriate lists (e.g. the uniqueness identifier list 40 and the job locator list 48) 140. Finally, the "print image" is printed using the transferred data 142.

Whether the uniqueness identifier compare has found a HIT or MISS, after the individual image has been printed it must then be determined whether the "print job" is complete 144. In other words, the program determines whether "print image" N has been printed 144. If the "print job" is complete, the program loops back to the portion of the program just prior to the "print image" and the associated uniqueness identifier being transferred to the printer controller. The program "loops" for each of the N images of the "print job."

Figure 5:
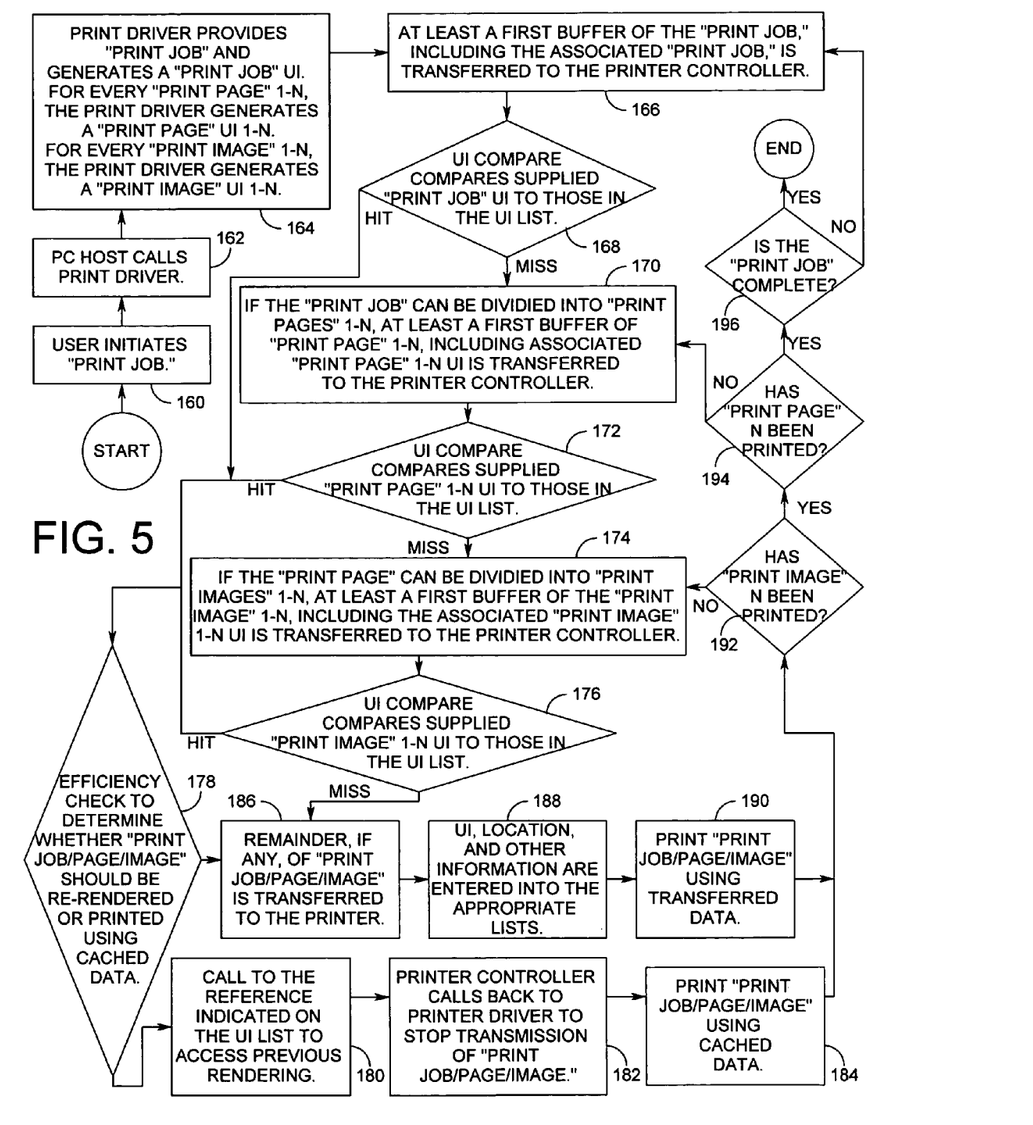
FIG. 5 is a simplified flow chart of an exemplary process for reducing FCO time using "print job," "print page," and "print image" uniqueness identifiers.

FIG. 5 shows another alternate implementation of the present invention in which it is determined whether the entire "print job," one or more "print page," or one or more "print image," has previously been rendered and printed. Specifically, after the user (possibly through an application) initiates a print job 160, a host computer calls a print driver 162. For every "print job," the print driver generates a "print page" uniqueness identifier 164. For every "print page" 1 to N, the print driver generates an associated "print page" uniqueness identifier 1 to N 164. For every "print image" 1 to N, the print driver generates an associated "print image" uniqueness identifier 1 to N 164. (It should be noted that the shown flow chart would require the print image 1 to N to be on the same page in order to loop properly. This implementation was chosen for clarity and is not meant to limit the scope of the invention.)

At this point, a series of inquiries begin in which it is determined whether the entire "print job" has previously been printed. Then it is determined whether any of the "print pages" have been previously printed. Finally, it is determined whether any of the "print images" have previously been printed. If the job, page, or image has previously been rendered (as determined by respective uniqueness identifier compares), then a "HIT" is registered, an optional efficiency check is performed, and the respective job, page, or image is printed.

Specifically, FIG. 5 shows this series of inquiries beginning with at least a first buffer of the "print job," including the associated "print job" uniqueness identifier, is transferred to the printer controller 166. The uniqueness identifier compare then compares the supplied "print job" uniqueness identifier to those in the uniqueness identifier list 168. If the "print job" uniqueness identifier is found in the uniqueness identifier list, a "HIT" is registered and the HIT procedure set forth below is performed. On the other hand, if the "print job" uniqueness identifier is not found in the uniqueness identifier list, a "MISS" is registered and the next level, the "print page" level, is examined. At the "print page" level, if the "print job" can be divided into "print pages" 1 to N, at least a first buffer of "print page" 1 to N, including the associated "print page" 1 to N uniqueness identifier, is transferred to the printer controller 170. The uniqueness identifier compare then compares the supplied "print page" 1 to N uniqueness identifier to those in the uniqueness identifier list 172. If the "print page" 1 to N uniqueness identifier is found in the uniqueness identifier list, a "HIT" is registered and the HIT procedure set forth below is performed. On the other hand, if the "print page" 1 to N uniqueness identifier is not found in the uniqueness identifier list, a "MISS" is registered and the next level, the "print image" level, is examined. At the "print image" level, if the "print page" can be divided into "print images" 1 to N, at least a first buffer of the "print image" 1 to N, including the associated "print image" 1 to N uniqueness identifier, is transferred to the printer controller 174. The uniqueness identifier compare then compares the supplied "print image" 1 to N uniqueness identifier to those in the uniqueness identifier list 176. If the "print image" 1 to N uniqueness identifier is found in the uniqueness identifier list, a "HIT" is registered and the HIT procedure as set forth below is performed. On the other hand, if the "print image" 1 to N uniqueness identifier is not found in the uniqueness identifier list, a "MISS" is registered.

If there is a HIT, as set forth above, a HIT procedure is performed that may include an optional efficiency check 178 and printing 180–190. Specifically, an efficiency check may be performed to determine whether the "print job/page/image" should be re-rendered or printed using cached data 178. This determination would most likely be based on such exemplary factors as the size of the "print job/page/image" and the speed of the host computer and printer. If the efficiency check determines it would be more efficient to re-render, the program would follow the procedure associated with a MISS as set forth below. Otherwise, the next step of the HIT procedure would be that the printer controller 32 would call to the reference location indicated on the uniqueness identifier list to access the previous rendering 180. (An exemplary method of referencing the reference location described in detail above uses a job number from the uniqueness identifier list 40 that references a data location on the job locator list 48 to find the data rendering on the hard disk 50.) Then the printer controller would call back to the printer driver to stop transmission of the "print job/page/image" 182. Finally, the "print job/page/image" is printed using the cached data 184.

On the other hand, if the uniqueness identifiers are not found in their respective uniqueness identifier lists (which may be a single combined uniqueness identifier list or separate uniqueness identifier lists for each type of division), or if the result of the efficiency check so dictates, a MISS procedure is performed. The MISS procedure includes the step of transferring the remainder, if any, of the "print job/page/image" to the printer 186. Then the reference location information (e.g. the uniqueness identifier, job number, and data location) is entered into appropriate lists (e.g. the uniqueness identifier list 40 and the job locator list 48) 188. Finally, the "print job/page/image" is printed using the transferred data 190.

Whether uniqueness identifier compare has found a HIT or MISS, after the individual page has been printed, it must then be determined whether the "print job/page/image" is complete 192, 194, 196. This is a reverse iterative process that first looks to see whether all the images on a page have been printed 192, then whether all the pages have been printed 194, and finally whether the entire "print job" has been printed 196. If any image on a page has not been printed or any page in a print job has not been printed, the program loops to the respective part of the program to continue. If the "print job" is complete, the program ends.

In the exemplary preferred embodiments set forth above, the print driver 26 generates or provides at least one uniqueness identifier 28 as well as the other information needed for rendering and printing. It should be noted that a dedicated processor or software driver mechanism could also perform the process of generating uniqueness identifiers. Further, depending on the application, specific configurations of the computer 20, printer 22, and the print job 27, many types of uniqueness identifier algorithms could be used to calculate the uniqueness identifiers. Some exemplary algorithms that could be used to calculate uniqueness identifiers are those associated with checksums. For example, checksum algorithms like SUM8, SUM16, SUM32, CRC16, and CRC32. SUM8, SUM16, and SUM32 add up the total bytes in the print job or subportion using, respectively, an 8 bit, 16 bit, or 32 bit number. CRC16 and CRC32 use, respectively, a 16 bit or 32 bit polynomial to calculate the checksum. Encryption keys can also be used to create the uniqueness identifier.

FIGS. 4 and 5, as discussed above, include an optional efficiency check. It should be noted that the efficiency check could be eliminated from these processes. Further, an efficiency check could be added to the processes shown in FIGS. 2 and 3. One reason to perform an efficiency check to determine whether a pre-determined portion of a document should be re-rendered or printed using cache data, is because the difference in the time it takes to transfer and re-render the data would vary compared to accessing the cached data. In other words, sometimes re-rendering would be more efficient and sometimes using cached data would be more efficient.

The flow charts set forth in FIGS. 2–5 are meant to be exemplary. Several of the steps set forth therein are simplified for clarity. Also, a print job 27 may be divided into subportions in other than page or image. For example, in addition to pages and images, the print job 27 may be divided by watermark, header, sentence, paragraph, or chapter. Also, the order of the steps is meant to be exemplary. For example, the steps of stopping transmission and printing can be done simultaneously or in reverse order. Similarly, the steps of entering information in lists and printing may be done simultaneously or in reverse order.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A method for reducing first copy out times of a "print portion," said method comprising the steps of:
   (a) executing a request to print said "print portion";
   (b) calculating a "print portion" uniqueness identifier in a host computer, said "print portion" uniqueness identifier specifically referring to and for identifying said "print portion";
   (c) comparing said "print portion" uniqueness identifier to a list of uniqueness identifiers stored in memory;
   (d) performing an efficiency check based on at least one factor selected from the group consisting of:
      (i) the size of said "print portion";
      (ii) the speed of said host computer; and
      (iii) the speed of said printer;
   (e) printing said "print portion" using previously rendered data stored in a memory location referenced by said list of uniqueness identifiers if said "print portion" uniqueness identifier is found in said list of uniqueness identifiers; and
   (f) storing said "print portion" uniqueness identifier and a reference to data stored in memory pertaining to said "print portion" in said list of uniqueness identifiers if said "print portion" uniqueness identifier is not found in said list of uniqueness identifiers.

2. The method of claim 1, said step of printing said "print portion" printing an entire print job.

3. The method of claim 1, said step of printing said "print portion" printing a portion of an entire print job.

4. The method of claim 3 further comprising the steps of:
   (a) said step of calculating a "print portion" uniqueness identifier specifically referring to said "print portion" including the step of calculating a "print portion" uniqueness identifier 1–N in a host computer, said "print portion" uniqueness identifier 1–N specifically referring to each "print portion" 1–N of said entire print job;
   (b) comparing said "print portion" uniqueness identifier 1–N to a list of uniqueness identifiers stored in memory;
   (c) printing said "print portion" 1–N using previously rendered data stored in a memory location referenced by said list of uniqueness identifiers if said "print portion" uniqueness identifier 1–N is found in said list of uniqueness identifiers; and
   (d) storing said "print portion" uniqueness identifier 1–N and a reference to data stored in memory pertaining to said "print portion" 1–N in said list of uniqueness identifiers if said "print portion" uniqueness identifier 1–N is not found in said list of uniqueness identifiers;
   (e) determining whether said entire print job has been printed; and
   (f) repeating steps (b)–(e) until said entire print job has been printed.

5. The method of claim 1 wherein said step of comparing said "print portion" uniqueness identifier to a list of uniqueness identifiers stored in memory further comprising the step of comparing said "print portion" uniqueness identifier to a list of uniqueness identifiers stored in memory in a printer.

6. The method of claim 5 further comprising the step of transferring said "print portion" uniqueness identifier from said host computer to said printer.

7. The method of claim 5 further comprising the step of transferring all or part of said "print portion" from said host computer to said printer if said "print portion" uniqueness identifier is not found in said list of uniqueness identifiers.

8. The method of claim 4 wherein said step of comparing said "print portion" uniqueness identifier 1–N to a list of uniqueness identifiers stored in memory further comprising the step of comparing said "print portion" uniqueness identifier 1–N to a list of uniqueness identifiers stored in memory in a printer.

9. The method of claim 8 further comprising the step of transferring said "print portion" uniqueness identifier 1–N from said host computer to said printer.

10. The method of claim 8 further comprising the step of transferring all or part of said "print portion" 1–N from said host computer to said printer if said "print portion" uniqueness identifier 1–N is not found in said list of uniqueness identifiers.

11. A method for reducing first copy out times for printing an entire print job, said method comprising the steps of:
(a) executing a request to print said entire print job, said entire print job divisible into "print portion" 1–N;
(b) calculating a "print portion" uniqueness identifier 1–N in a host computer, said "print portion" uniqueness identifier 1–N specifically referring to and for identifying each "print portion" 1–N of said entire print job;
(c) for a consecutive one of "print portion" 1–N, comparing said "print portion" uniqueness identifier 1–N to a list of uniqueness identifiers stored in memory;
(d) for said consecutive one of "print portion" 1–N, printing said "print portion" 1–N using previously rendered data stored in a memory location referenced by said list of uniqueness identifiers if said "print portion" uniqueness identifier 1–N is found in said list of uniqueness identifiers; and
(e) for said consecutive one of "print portion" 1–N, storing said "print portion" uniqueness identifier 1–N and a reference to data stored in memory pertaining to said "print portion" 1–N in said list of uniqueness identifiers if said "print portion" uniqueness identifier 1–N is not found in said list of uniqueness identifiers;
(f) determining whether said entire print job has been printed;
(g) repeating steps (c)–(f) until said entire print job has been printed; and
(h) performing an efficiency check based on at least one factor selected from the group consisting of:
  (i) the size of said "print portion";
  (ii) the speed of said host computer; and
  (iii) the speed of said printer.

12. The method of claim 11 wherein said step of comparing said "print portion" uniqueness identifier 1–N to a list of uniqueness identifiers stored in memory further comprising the step of comparing said "print portion" uniqueness identifier 1–N to a list of uniqueness identifiers stored in memory in a printer.

13. The method of claim 12 further comprising the step of transferring said "print portion" uniqueness identifier 1–N from said host computer to said printer.

14. The method of claim 12 further comprising the step of transferring all or part of said "print portion" 1–N from said host computer to said printer if said "print portion" uniqueness identifier 1–N is not found in said list of uniqueness identifiers.

* * * * *